United States Patent
Jones et al.

(10) Patent No.: US 7,255,306 B2
(45) Date of Patent: Aug. 14, 2007

(54) METHOD AND COMPUTER PROGRAM PRODUCT FOR CONTROLLING THE CONTROL EFFECTORS OF AN AERODYNAMIC VEHICLE

(75) Inventors: Richard D. Jones, Issaquah, WA (US); Jeffrey L. Musgrave, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/981,331

(22) Filed: Nov. 4, 2004

(65) Prior Publication Data
US 2005/0178922 A1    Aug. 18, 2005

Related U.S. Application Data

(62) Division of application No. 10/317,370, filed on Dec. 12, 2002, now Pat. No. 6,814,330.

(51) Int. Cl.
*B64C 13/18* (2006.01)
(52) U.S. Cl. .................................................. 244/76 R
(58) Field of Classification Search ............. 244/76 R, 244/194, 195, 175; 701/3, 8
See application file for complete search history.

(56) References Cited

U.S. PATENT DOCUMENTS

| | | | |
|---|---|---|---|
| 3,230,351 A * | 1/1966 | Platt et al. ..................... | 700/30 |
| 3,940,673 A | 2/1976 | Darlington | |
| 4,354,240 A | 10/1982 | Olive | |
| 4,471,439 A | 9/1984 | Robbins et al. | |
| 4,641,268 A | 2/1987 | Zweifel et al. | |
| 4,764,872 A | 8/1988 | Miller | |
| 5,070,458 A * | 12/1991 | Gilmore et al. ............... | 701/14 |
| 5,337,982 A * | 8/1994 | Sherry ......................... | 244/186 |
| 5,406,488 A | 4/1995 | Booth | |
| 5,442,909 A | 8/1995 | Snow et al. | |
| 5,528,119 A | 6/1996 | Rundqwist et al. | |
| RE35,387 E | 12/1996 | Strom | |
| 5,695,156 A | 12/1997 | Firuz et al. | |
| 5,833,177 A * | 11/1998 | Gast ............................ | 244/195 |
| 5,984,229 A * | 11/1999 | Hollowell et al. ......... | 244/12.4 |
| 5,984,240 A * | 11/1999 | Shinagawa .................. | 244/195 |
| 6,047,927 A | 4/2000 | Heiberg et al. | |
| 6,128,554 A | 10/2000 | Damotte | |
| 6,195,981 B1 * | 3/2001 | Hanley et al. ................ | 60/204 |
| 6,591,169 B2 | 7/2003 | Jones et al. | |
| 6,711,476 B2 | 3/2004 | Jones et al. | |

* cited by examiner

*Primary Examiner*—Tien Dinh
(74) *Attorney, Agent, or Firm*—Alston & Bird LLP

(57) ABSTRACT

A method and computer program product are provided for controlling the control effectors of an aerodynamic vehicle including, for example, the respective positions of nozzles and aerodynamic surfaces, to affect a desired change in the time rate of change of the system state vector. The method initially determines differences between anticipated changes in the states of the aerodynamic vehicle based upon the current state of each control effector, and desired state changes. These differences may be weighted based upon a predetermined criteria, such as the importance of the respective states and/or the weight to be attributed to outliers. The differences between the anticipated and desired state changes are converted to the corresponding rates of change of the control effectors. Control signals are then issued to the control effectors to affect the desired change in the time rate of change of the system state vector.

12 Claims, 2 Drawing Sheets

METHOD AND COMPUTER PROGRAM PRODUCT FOR CONTROLLING THE CONTROL EFFECTORS OF AN AERODYNAMIC VEHICLE

CROSS-REFERENCE TO RELATED APPLICATIONS

This application is a divisional of U.S. application Ser. No. 10/317,370, filed Dec. 12, 2002, now U.S. Pat. No. 6,814,330, which is hereby incorporated herein in its entirety by reference.

FIELD OF THE INVENTION

The present invention relates generally to a method of controlling the control effectors of an aerodynamic vehicle and, more particularly, to an integrated method for controlling the control effectors of an aerodynamic vehicle, including the aerodynamic surfaces, thrust variations and nozzle vectoring, in order to efficiently cause a desired change in the time rate of change of the system state vector of the aerodynamic vehicle during various stages of flight.

BACKGROUND OF THE INVENTION

During flight, the control of aerodynamic vehicles, such as aircraft, is principally accomplished via a variety of flight control effectors. These flight control effectors include aerodynamic controls such as the rudder, elevators, ailerons, speed brakes, engine thrust variations, nozzle vectoring and the like. By altering the various flight control effectors, the system state vector that defines the current state of the aerodynamic vehicle can be changed. In this regard, the system state vector of an aerodynamic vehicle in flight typically defines a plurality of current vehicle states such as the angle of attack, the angle of side slip, the air speed, the vehicle attitude and the like.

Historically, the flight control effectors were directly linked to various input devices operated by the pilot. For example, flight control effectors have been linked via cabling to the throttle levers and the control column or stick. More recently, the flight control effectors have been driven by a flight control computer which, in turn, receives inputs from the various input devices operated by the pilot. By appropriately adjusting the input devices, a pilot may therefore controllably alter the time rate of change of the current system state vector of the aerodynamic vehicle.

Unfortunately, flight control effectors may occasionally fail, thereby adversely affecting the ability of conventional control systems to maintain the dynamic stability and performance of the aerodynamic vehicle. In order to accommodate failures of one or more of the flight control effectors, control effectors failure detection and flight control reconfiguration systems have been developed. These systems typically remove the flight control effectors that have been identified as inoperable from the control system. These systems are therefore designed to detect the failure of one or more flight control effectors and to alter the control logic associated with one or more of the flight control effectors that remain operable in an attempt to produce the desired change in the time rate of change of the current system state vector of an aerodynamic vehicle requested by the pilot. These failure detection and flight control reconfiguration systems are highly complex. As such, the proper operation of these systems is difficult to verify. Moreover, these systems introduce a risk that a flight control effector that is actually functioning properly may be falsely identified as having failed and thereafter removed from the control system, thereby potentially and unnecessarily rendering the control system less effective.

Additionally, the control effectors of an aerodynamic vehicle generally have some limitations on their performance. In this regard, the rate of change accommodated by most control effectors is generally limited to a range bounded by upper and lower limits. By way of example, for aircraft, such as direct lift aircraft, that permit nozzle vectoring, the actual position which the nozzles may assume is typically limited to within upper and lower limits. Unfortunately, conventional control systems do not accommodate limitations in the range of settings and rate of change of the control effectors. As such, conventional control systems may attempt to alter a control effector in a manner that exceeds its limitations. Since the control effector will be unable to make the desired change, the control system may correspondingly fail to produce the desired change in the time rate of change of the system state vector of the aircraft.

In addition to the aerodynamic surfaces commonly utilized to control the flight of an aerodynamic vehicle, aircraft has been developed that can provide additional control by means of thrust variations and/or thrust or nozzle vectoring. For example, some multi-engine aircraft permit the plurality of engines to be driven differently so as to generate different levels of thrust which, in turn, can serve to assist in the controlled flight of the aircraft. As another example, vectoring nozzles that may be commanded to assume any of a range of positions and bi-directional nozzles that direct the exhaust in one of two directions have been developed. By controllably directing at least a portion of the engine exhaust in different directions, vectoring nozzles, which shall hereafter also generally include bi-directional nozzles, can also assist in the controlled flight of the aircraft.

While various control systems have been developed to control the flight control effectors during flight, these control systems generally do not integrate the control provided by aerodynamic surfaces during flight with the control needed in instances in which the aircraft has no, or a negligible, velocity such that the aerodynamic control surfaces, such as the rudder, elevators, ailerons or the like, do not significantly contribute, if at all, to the lift and attitude control of the aircraft. In this regard, direct lift aircraft have been and are being developed. Direct lift aircraft have control effectors, such as vectoring nozzles or bi-directional nozzles, that can direct the engine exhaust in different directions to provide lift and attitude control of the aircraft. By appropriately positioning the nozzles, a direct lift aircraft can takeoff and land in a substantially vertical manner. As such, during takeoff and landing, the aerodynamic control surfaces do not significantly contribute to the lift and the attitude control of the direct lift aircraft. Instead, the lift and attitude control are principally provided and controlled by any thrust variations provided by the engines and the vectoring of the associated nozzles.

In order to control the lift and attitude of an aircraft during a vertical takeoff or landing, control systems have been developed to control the engines and the associated nozzles. For example, one control system employs an optimization algorithm, termed an L1 optimization algorithm. While generally effective, this optimization algorithm suffers from several deficiencies. In this regard, the optimization algorithm is computationally complex, thereby requiring substantial computing resources and being difficult and costly to expand or scale to accommodate more sophisticated control schemes, such as the control scheme necessary to control vectoring nozzles as opposed to simpler bi-directional nozzles. The computational complexity of the optimization algorithm may also cause the solution to be approximated in instances in which the optimization algorithm cannot arrive at an exact solution within the time frame required to maintain stability of the aircraft. In addition, the optimization algorithm may not converge in all situations. In instances in which the optimization algorithm may not converge, the prior solution, i.e., the solution from a prior iteration of the optimization algorithm, would continue to be utilized, thereby resulting in a sub-optimal solution.

As such, it would be desirable to provide an improved control system that effectively integrates the various control effectors including the aerodynamic surfaces and the thrust variations and nozzle vectoring so as comprehensively control the aerodynamic vehicle during different stages of flight, including for example, the vertical takeoff and landing of a direct lift aircraft during which thrust variations and nozzle vectoring dominate the control scheme as well as in flight during which the aerodynamic surfaces provide a greater measure of control. In addition, it would be desirable to develop a method of controlling the control effectors of an aerodynamic vehicle, such as a direct lift aircraft, which provides increased flexibility with respect to the removal or inclusion of a flight control effector that may have failed. In addition, it would be advantageous to provide a method for controlling the control effectors of an aerodynamic vehicle, including a direct lift aircraft, in a manner that recognizes and accommodates limitations in the settings and rate of change of at least some of the control effectors.

SUMMARY OF THE INVENTION

An improved method and computer program product are therefore provided for controlling the plurality of control effectors of an aerodynamic vehicle in order to efficiently bring about a desired change in the time rate of change of the system state vector of the aerodynamic vehicle. Advantageously, the method and computer program product provide an integrated control scheme for controlling thrust variations and nozzle vectoring, as well as various aerodynamic surfaces throughout all phases of flight including takeoff, flight and landing. By integrating the control of thrust variations and nozzle vectoring with the control of aerodynamic surfaces, the method and computer program product can also provide control during vertical takeoff and landing scenarios.

The method and computer program product of one aspect of the present invention permits the control of the control effectors to be tailored based upon predetermined criteria, such as the relative importance of the respective states of the aerodynamic vehicle and/or the weighting to be given to any outlier measurements. According to another aspect, the method and computer program product control the plurality of control effectors while recognizing limitations upon the permissible changes to at least one control effector, such as limitations upon the rate of change or the range of positions of at least one control effector. As such, the method and computer program product of the present invention address the shortcomings of conventional control systems and efficiently command the control effectors so as to alter the time rate of change of the system state vector of the aerodynamic vehicle in a desired manner.

The method and computer program product control the control effectors of an aerodynamic vehicle by initially determining the current commanded state of the plurality of control effectors including, for example, the current commanded position of each nozzle, the current commanded level of thrust for each engine and the current commanded position of at least one aerodynamic surface. The method and computer program product then determine the differences between anticipated changes in the plurality of states of the aerodynamic vehicle based upon the current state of each control effector and the current flight conditions, and desired changes in the plurality of states of the aerodynamic vehicle. In order to determine the differences between the anticipated and desired changes in the plurality of state rates of the aerodynamic vehicle, the dot product of a vector representing the current commanded state of each control effector and a matrix representing changes in the plurality of states of the aerodynamic vehicle in response to changes in the control effectors at the current flight conditions is initially determined. In this regard, the matrix includes a plurality of terms, each of which represents the anticipated change in a respective state rate of the aerodynamic vehicle in response to the change of a respective control effector at the current flight conditions. By considering the effect of changes in a control effector at the current flight conditions, the method and computer program product can rely upon the control provided by thrust variations and nozzle vectoring more heavily during vertical takeoff and landing and upon the control provided by aerodynamic surfaces more heavily once in flight, thereby providing an integrated and robust control scheme. In order to determine the difference between the anticipated and desired changes in the plurality of states of the aerodynamic vehicle, the vector difference between the dot product and a vector representing the desired change in the plurality of states of the aerodynamic vehicle is obtained in one embodiment.

According to one aspect of the present invention, the differences between the anticipated and desired changes in the plurality of states of the aerodynamic vehicle are then weighted based upon a predetermined criteria. In this regard, the differences may be weighted based upon the relative importance of the respective states of the aerodynamic vehicle, thereby permitting those states which are believed to be of greater importance to be assigned a correspondingly greater weight. As a result of this greater weight, the method and computer program product of this aspect of the present invention will control the control effectors so as to more quickly alter these states than other states having lower weights assigned thereto. In addition or in the alternate, the differences may be nonlinearly weighted by a predefined penalty based upon the emphasis to be placed upon outliers, i.e., relatively large differences between the anticipated and desired changes in the plurality of states of the aerodynamic vehicle. A predefined penalty may also be utilized to emphasize the importance of certain relationships, such as maintaining area match for each engine, with relatively large penalties being assigned to variations from the desired relationship.

Based upon the weighted differences between the anticipated and desired changes in the plurality of states of the aerodynamic vehicle, the method and computer program product may determine a second dot product of the weighted vector difference and a transpose of the matrix representing changes in the state rates of the aerodynamic vehicle in response to changes in the plurality of control effectors. The second dot product therefore represents the changes in the control effectors required to affect the desired changes in the plurality of states of the aerodynamic vehicle, given the anticipated changes in the plurality of states. As such, the weightings assigned to the respective states of the aerodynamic vehicle will correspondingly effect changes in the desired state of the control effectors. By utilizing the transpose of the matrix representing changes in the state rates of the aerodynamic vehicle in response to changes in the control effectors, the method and computer program product effectively cause the control effectors that will have the greatest impact upon effecting the desired change to be adjusted to a greater degree than the control effectors that will have less impact upon effecting the desired change, thereby improving the efficiency of the control scheme. The second dot product may also be weighted by a gain matrix, one term of which is associated with each control effector in order to appropriately weight the relative contributions of the control effectors.

According to another advantageous aspect of the present invention, the method and computer program product may also limit the permissible changes of at least one of the control effectors. In this regard, the permissible rate of change of one or more of the control effectors may be limited. Similarly, the position of one or more of the control effectors may also be limited to within a predefined range. As such, the method and computer program product of the present invention effectively recognize and accommodate limitations of the control effectors, thereby preventing any attempts to drive the control effectors beyond their predefined limitations.

The method and computer program product then issue control signals to the plurality of control effectors so as to implement at least a portion of the desired change in the time rate of change of the system state vector of the aerodynamic vehicle. In those aspects of the present invention in which the differences between the anticipated and desired changes in the plurality of states of the aerodynamic vehicle are weighted, the control signals are at least partially based upon the weighted differences. More particularly, in those embodiments in which the second dot product of the weighted vector difference and the transpose of the matrix representing changes in the system state vector of the aerodynamic vehicle in response to the changes in the plurality of control effectors is determined, the control signals are at least partially based upon the second dot product. Moreover, the control signals may be more directly weighted by the gain matrix. Additionally, in those aspects of the present invention in which the permissible changes of at least one of the control effectors is limited, the control signals issued to the control effectors are subject to the limitations in the permissible changes of one or more of the control effectors. Thus, at least a portion of the desired change in the plurality of states of the aerodynamic vehicle may be implemented without exceeding the permissible changes of the control effectors.

Thus, the method and computer program product of the present invention provide an improved technique for efficiently controlling the control effectors of an aerodynamic vehicle in order to effect the desired change in the time rate of change of the system state vector of the aerodynamic vehicle. Advantageously, the method and computer program product provide an integrated control scheme for controlling thrust variations and nozzle vectoring, as well as various aerodynamic surfaces throughout all phases of flight including takeoff, flight and landing. According to one aspect of the present invention, the control of the control effectors may be influenced by weighting based upon a predetermined criteria, thereby permitting the control system to be more individually tailored and efficiently implemented. According to another aspect of the present invention, the permissible changes of one or more of the control effectors may be limited such that the desired change in the time rate of change of the system state vector of the aerodynamic vehicle may be affected without attempting to exceed the permissible changes of at one or more of the control effectors.

BRIEF DESCRIPTION OF THE DRAWINGS

Figure 1:
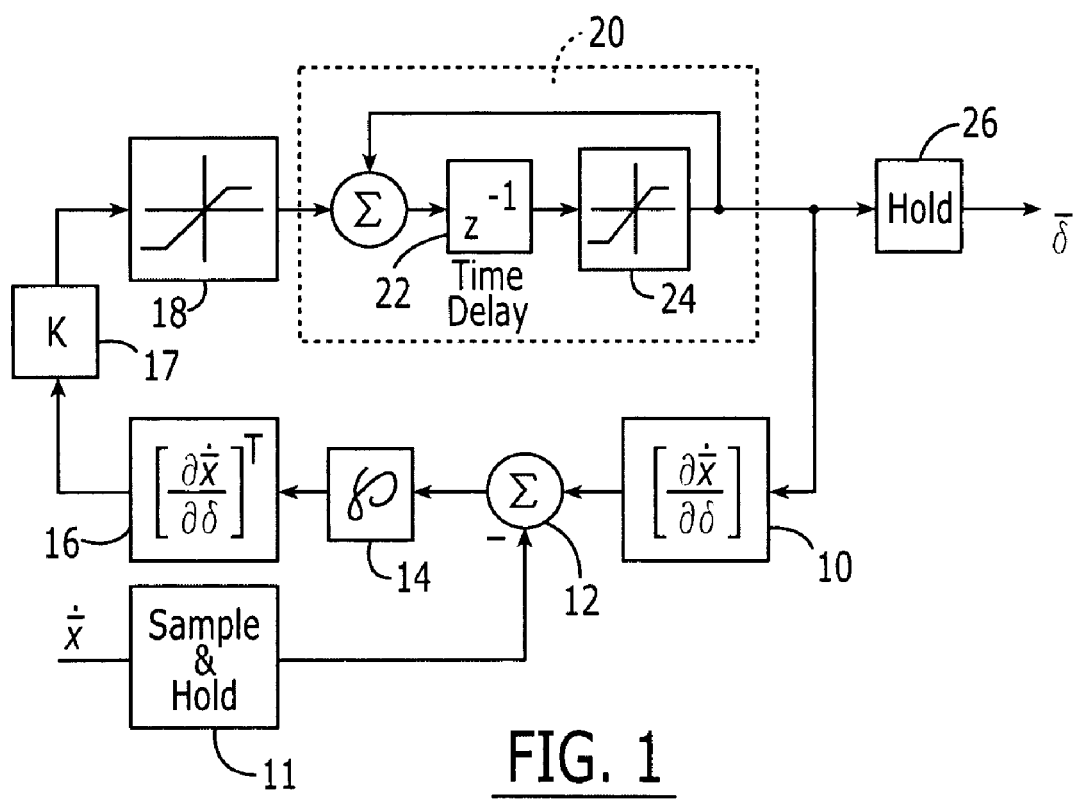
Figure 2:
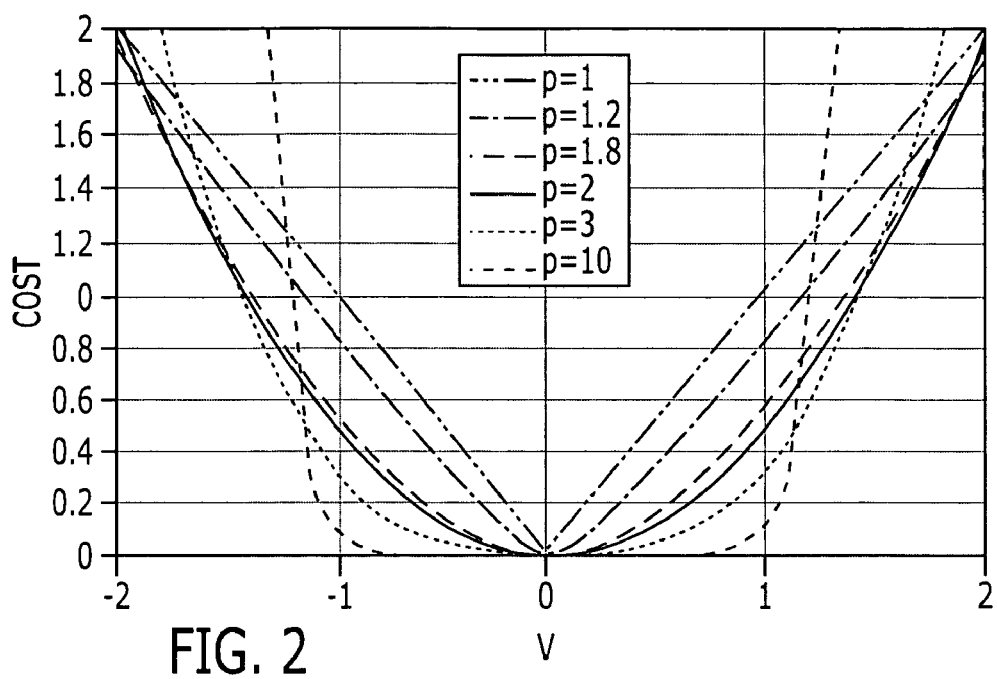
Figure 3:
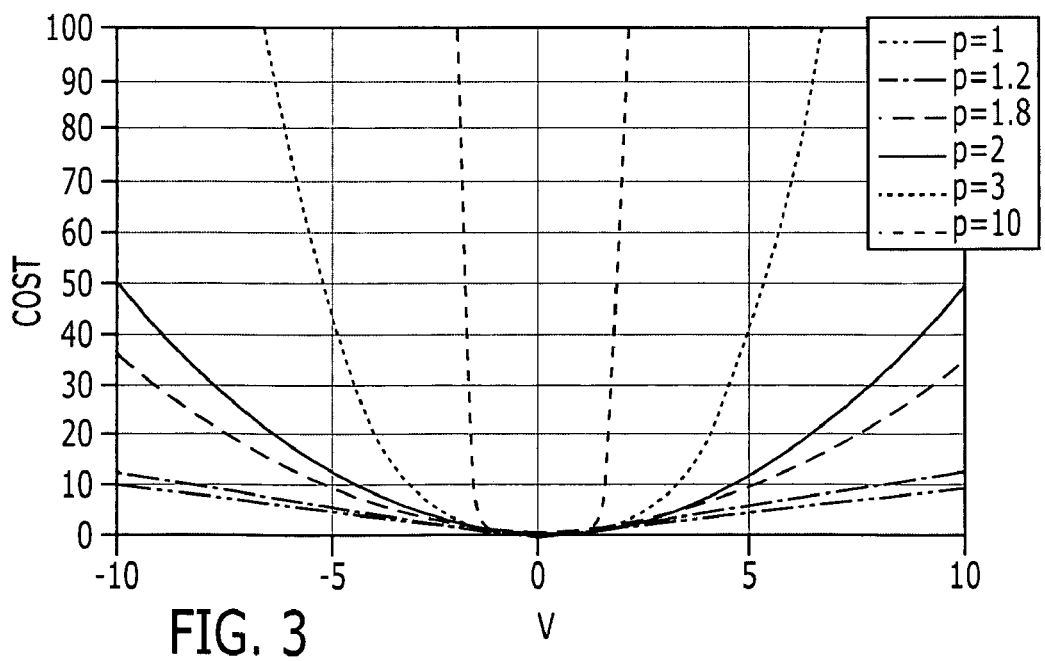

Having thus described the invention in general terms, reference will now be made to the accompanying drawings, which are not necessarily drawn to scale, and wherein:

FIG. 1 is a block diagram illustrating the operations performed by the method and computer program product of one embodiment of the present invention;

FIG. 2 is a graph representing the affect attributable to the imposition of different predefined penalties; and FIG. 3 is an expanded view of the graph of FIG. 2 illustrating the affect of the imposition of different predefined penalties.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A method and a corresponding computer program product are provided for controlling the plurality of control effectors of an aerodynamic vehicle, such as an aircraft, including, for example, a direct lift aircraft capable of vertical takeoff and landing. As known to those skilled in the art, aerodynamic vehicles have a wide variety of control effectors with the type and number of control effectors depending upon the type and model of the aerodynamic vehicle. By way of example, typical control effectors include aerodynamic surfaces, such as the rudder, elevators and ailerons. Other control effectors include speed brakes, engine thrust variations and nozzle vectoring including the control of bidirectional nozzles. As will be understood by those skilled in the art, nozzle vectoring generally includes the positioning of the main lift nozzle and, in some embodiments, the positioning of the nozzles associated with one or more attitude control effectors.

As described below, the control method of the present invention integrates the control of these various control effectors, including the aerodynamic surfaces, thrust variations and nozzle vectoring, to permit improved control over all phases of flight. Moreover, the control method advantageously utilizes the various types of control effectors differently during different stages of flight based, at least in apart, upon the effect occasioned by changes in the various control effectors at the current flight conditions. For a direct lift aircraft, for example, the control effectors that are principally utilized during vertical takeoff and landing are thrust variations provided by each engine and the associated nozzle positions, i.e., nozzle vectoring, but do not include the aerodynamic surfaces since the aerodynamic surfaces provide very little, if any, control since the aerodynamic vehicle has no forward velocity. Conversely, during wingborne flight, the control method relies more heavily upon the aerodynamic surfaces and much less heavily upon thrust variations and nozzle vectoring in order to efficiently control the aerodynamic vehicle.

As shown in FIG. 1 and described hereinafter, the control method may be implemented in the discrete domain utilizing digital signals. Alternatively, the control method may be implemented in the continuous domain utilizing analog signals if so desired. Regardless of the domain in which the control method is implemented, the control method depicted in FIG. 1 is automated and is generally implemented by means of a computer, such as a flight control computer or the like. As such, the control method is typically embodied in a computer program product which directs the flight control computer to issue appropriate commands to the plurality of control effectors in order to control the aerodynamic vehicle as desired.

As shown, the current commands $\bar{\delta}$ issued to the control effectors are monitored. The current commands $\bar{\delta}$ define the current state to which each control effector has been commanded. For example, the commands associated with an aerodynamic surface, such as a rudder, elevator or aileron, define the position to which the respective aerodynamic surface is currently being directed to assume. Similarly, commands may be issued to the respective engines to define the thrust to be generated and to the nozzles to define the position that the nozzles should assume. Typically, the current commands are represented by a vector $\bar{\delta}$ which includes a term defining the state to which each respective control effector is currently commanded.

Based upon the current control effector commands $\bar{\delta}$, the anticipated changes in the plurality of states of the aerodynamic vehicle are determined. In this regard, an aerodynamic vehicle that is in flight has a number of states $\bar{x}$, including the angle of attack, the angle of side slip, the air speed, the vehicle attitude, the lift, the altitude and the like. In addition, the states of an aerodynamic vehicle that are considered by the control method may also include a plurality of engine parameters, such as temperature, pressure, total area and the like. As known to those skilled in the art, the states of an aerodynamic vehicle may vary somewhat depending upon the type and model of the aerodynamic vehicle, but are well defined for a respective type and model of aerodynamic vehicle.

In order to determine the anticipated changes in the system rate of change of the state vector $\bar{x}$ of the aerodynamic vehicle based upon the current commands $\bar{\delta}$, a matrix $$\left[\frac{\partial \dot{\bar{x}}}{\partial \bar{\delta}}\right]$$

may be defined that represents changes in the rate of change of the respective states (hereinafter termed the state rates) of the aerodynamic vehicle in response to changes in the plurality of control effectors. See block 10 of FIG. 1. The matrix includes a plurality of terms with each term representing the change in a respective state rate of the aerodynamic vehicle in response to the change of a respective control effector. As such, the matrix represents the manner in which the aerodynamic vehicle is anticipated to respond to changes in the control effectors. Typically, the matrix is constructed to have a plurality of rows and a plurality of columns. Each column generally includes a plurality of terms, each of which defines the anticipated change in a respective state rate of the aerodynamic vehicle in response to the change in the same control effector. Thus, each column of the matrix represents the anticipated changes in the state rates of the aerodynamic vehicle due to a change of a respective control effector.

The matrix $$\left[\frac{\partial \dot{\bar{x}}}{\partial \bar{\delta}}\right]$$

may be constructed by a variety of techniques. In one technique, the matrix is constructed as a result of numerical calculations. In this technique, the current states of the aerodynamic vehicle and the current settings of the control effectors are provided. Based upon the current states of the aerodynamic vehicle and the current settings of the control effectors, the resulting forces and torques acting upon the aerodynamic vehicle are determined. By factoring in the mass and inertia of the aerodynamic vehicle, the state rates may be determined.

In order to determine the resulting forces and torques acting upon the aerodynamic vehicle, the aerodynamic coefficients for the current flight condition, as defined by the current states $\bar{x}$ of the aerodynamic vehicle, are determined. As known to those skilled in the art, aerodynamic databases are available for most aerodynamic vehicles that define the various aerodynamic coefficients based upon the current states of the aerodynamic vehicle. The aerodynamic coefficients of an aerodynamic vehicle may vary based upon the type and model of the aerodynamic vehicle, but typically include coefficients such as lift, drag, pitching moment, side force, rolling moment, yawing moment and the like. While the aerodynamic coefficients may vary based upon the type and model of the aerodynamic vehicle, the aerodynamic coefficients for a particular type and model of aerodynamic vehicle will be well defined and known to those skilled in the art.

The resulting forces and torques upon the aerodynamic vehicle can then be determined based upon the aerodynamic coefficients by means of force buildup equations, also known to those skilled in the art. In this regard, the force buildup equations will also generally vary depending upon the type and model of aerodynamic vehicle. However, for a particular type and model of aerodynamic vehicle, the force buildup equations are well established and known to those skilled in the art. In addition to the aerodynamic coefficients, force buildup equations generally take into account the current dynamic pressure as well as a number of other parameters, such as the mass, inertia, span, reference area and the like, which are well known to those skilled in the art. The dynamic pressure is based upon the square of the velocity such that the force buildup equations effectively take into account the current flight conditions.

The anticipated changes in the state rates of the aerodynamic vehicle are then determined based upon finite differences. In this regard, one control effector is considered to have varied slightly, such as 1% or less, from its current state and the process of determining the resulting forces and torques acting upon the aerodynamic vehicle is repeated, albeit with the state of one control effector having been varied somewhat. The resulting change in the forces and torques acting upon the aerodynamic vehicle following the slight variation of one control effector are then determined. By factoring out the mass and inertia of the aerodynamic vehicle from the force buildup equations representative of the changes in the forces and torques occasioned by a slight variation in one control effectors, the change in each state rate of the aerodynamic vehicle attributable to the change in the respective control effector may be determined, thereby defining one column in the resulting matrix $$\left[\frac{\partial \dot{\bar{x}}}{\partial \bar{\delta}}\right].$$

The foregoing process of slightly varying a respective control effector and determining the resulting change in forces and torques acting upon the aerodynamic vehicle and, correspondingly, the resulting changes in the state rates of the aerodynamic vehicle is repeated for each control effector in order to construct the entire matrix.

Alternatively, the matrix $$\left[\frac{\partial \dot{\bar{x}}}{\partial \bar{\delta}}\right]$$

may be determined based upon an analytic calculation. According to this alternative technique, a nonlinear multi-dimensional analytic curve may be fit to each respective aerodynamic coefficient defined by the aerodynamic database. In this regard, the aerodynamic database separately defines each aerodynamic coefficient at each of a large number of different flight conditions, with a respective flight condition defined by a respective system state vector $\bar{x}$ and the current state of the control effectors. The nonlinear multidimensional curves may be fit to respective aerodynamic coefficients according to any of a variety of techniques. In one embodiment, however, the nonlinear multi-dimensional curves are fit to respective aerodynamic coefficients. Since the aerodynamic coefficients are now represented by analytic functions, the partial derivatives of each aerodynamic coefficient with respect to a change in a respective control effector may then be readily determined by hand or, more commonly, by utilizing a commercially available program such as Mathematica. By utilizing the nonlinear multidimensional polynomial curve representing each aerodynamic coefficient, along with dynamic pressure, vehicle mass, inertia, span, reference area and other parameters, the force buildup equations for the aerodynamic vehicle may again be constructed as known to those skilled in the art. The partial derivatives of each force with respect to each aerodynamic coefficient may then be determined. By utilizing the chain rule and the partial derivatives of the aerodynamic coefficients with respect to changes in respective control effectors and the partial derivatives of the forces with respect to respective aerodynamic coefficients, the partial derivatives of the forces with respect to changes in respective control effectors may be determined. By factoring out the mass and inertia of the aerodynamic vehicle, the partial derivatives of the forces with respect to changes in respective control effectors can be translated into the partial derivatives of the state rates of the aerodynamic vehicle with respect to changes in each control effector. Thereafter, the matrix can be constructed as described above.

Regardless of the manner in which the matrix $$\left[\frac{\partial \dot{\bar{x}}}{\partial \bar{\delta}}\right]$$

is to be constructed, the matrix is preferably determined in real time based upon the current flight conditions including the dynamic pressure and the current control effector commands $\bar{\delta}$ of the aerodynamic vehicle. Following construction of the matrix, the anticipated change in each state rate of the aerodynamic vehicle is determined by the vector multiplication of the vector $\bar{\delta}$ representing the current commands and the matrix. In particular, the dot product of the vector representing the current commands and the matrix is determined.

By taking into account the current flight conditions including, for example, the dynamic pressure and, in turn, the velocity of the aerodynamic vehicle during the construction of the matrix, the anticipated change in the plurality of state rates is based not only upon the current commanded state of the control effectors, but also the current flight conditions. In this regard, the matrix is constructed such that the anticipated change in each state rate is dominated at those phases of flight, such as vertical takeoff and landing, in which the aerodynamic vehicle has low or no velocity by the thrust variations and the nozzle vectoring with little if any, contribution by the aerodynamic surfaces. As the velocity increases, the contribution provided by the aerodynamic surfaces to the anticipated change in each state rate correspondingly increases while the contribution provided by thrust variations and nozzle vectoring remains unchanged until the contributions provided by the aerodynamic surfaces are of sufficient magnitude to control the anticipated changes in each state rate at higher velocities without the aid of propulsive devices, such as thrust variations and nozzle vectoring. The increasing dynamic pressure has little affect on the amount of control authority generated by propulsive devices. So, as dynamic pressure increases, the amount of augmentation required by the use of the propulsive devices decreases until the aerodynamic surfaces provide all the required authority and the propulsive devices can be turned off to conserve fuel or used to increase airspeed. Generally, aerodynamic surfaces are a much more efficient way to control the air vehicle when compared to propulsive devices.

The desired change $$\dot{\bar{x}}_{com}$$

in the respective state rates of the aerodynamic vehicle is also provided, such as by pilot input, and is stored by a conventional sample and hold circuit 11. This desired change $$\dot{\bar{x}}_{com}$$

in the respective state rates of the aerodynamic vehicle may represent a change in the state rates of selected states of the aerodynamic vehicle or all of the states of the aerodynamic vehicle, typically depending upon the pilot input. In order to determine the manner in which the control effectors must be controlled in order to affect the desired change $$\dot{x}_{com}$$

in the respective state rates of the aerodynamic vehicle, the difference between the anticipated and desired changes in the state rates of the aerodynamic vehicle is determined. Since the desired change $$\dot{x}_{com}$$

in the respective state rates of the aerodynamic vehicle is also typically represented by a vector, the vector difference between the dot product representing the anticipated change in state rates of the aerodynamic vehicle and the vector representing the desired changes in the state rates is obtained as shown in block 12 of FIG. 1.

According to one advantageous aspect of the present invention, the difference between the anticipated and desired changes in the state rates of the aerodynamic vehicle may be weighted based upon a predefined criteria. One predefined criteria defines the relative importance of the respective states of the aerodynamic vehicle. Thus, the differences between the anticipated and desired changes in the state rates of the aerodynamic vehicle, typically represented as a vector difference, can be weighted so as to affect changes in some states of the aerodynamic vehicle more rapidly than other states due to the relative importance of the states for which changes are more rapidly affected. As such, a respective weight $\overline{w}$ may be assigned to the state of the aerodynamic vehicle, such as during system configuration or the like.

Another predetermined criteria is a predefined penalty $\overline{p}$ that may serve to place lesser or greater emphasis on outlier values. In this regard, the effect of the predefined penalty will vary based upon the magnitude of the difference between the anticipated and desired changes in the respective state rate of the aerodynamic vehicle, with relative large differences being considered outliers. For example, small penalties may be assigned to the outliers in those systems that are designed to factor the impact of the outliers into the control process, while large penalties may be assigned to outliers in those systems that desire to deemphasize the contributions of outliers since they may be attributable to an error. By way of example, the control method desirably maintains the total area required by each engine. In this regard, for a respective engine providing a certain level of thrust, the effective outlet area that the engine sees must remain constant as the nozzles are opened, closed and repositioned.

In order to affect the weighting, the vector operator $\wp$(designated 14 in FIG. 1) is defined as follows:

$$\wp(\overline{v}, \overline{w}, \overline{p})_i = w_i \, sgn \, (v_i) \|v_i\|^{p_i - 1}$$

wherein i represents a respective state of the aerodynamic vehicle, $w_i$ is the weight assigned to each state of the aerodynamic vehicle, $p_i$ is the predefined penalty assigned to each state of the aerodynamic vehicle and $v_i$ is the difference between the anticipated and desired changes in each state rate of the aerodynamic vehicle. Both $w_i$ and $p_i$ are defined to be greater than or equal to 0. By multiplying the vector difference between the anticipated and desired changes in the state rates of the aerodynamic vehicle and the vector operator $\wp$ as shown in block 14, the weighted differences between the anticipated and desired changes in the state rates of the aerodynamic vehicle are obtained.

These weighted differences between the anticipated and desired changes in the state rates of the aerodynamic vehicle are then converted to the corresponding changes in the control effectors to bring about the desired changes $$\dot{x}_{com}$$

in the state rates. In the illustrated embodiment, the weighted differences are multiplied by the transpose $$\left[\frac{\partial \dot{\overline{x}}}{\partial \overline{\delta}}\right]^T$$

of the matrix representing the changes in the state rates of the aerodynamic vehicle in response to the changes in the plurality of control effectors as shown in block 16 of FIG. 1. In other words, the dot product of the weighted vector difference and the transpose of the matrix representing changes in the state rates of the aerodynamic vehicle in response to changes in the plurality of control effectors is determined. As such, the rate of changes $$\dot{\overline{\delta}}$$

of the control effectors required to affect the desired changes in the state rates of the aerodynamic vehicle subject to the anticipated changes in the state rates of the aerodynamic vehicle based upon the current commanded state of each control effector is determined. Since each term of the vector difference between the anticipated and desired changes in the state rates of the aerodynamic vehicle has been weighted, the resulting commands to the control effectors to affect the desired change in the state rates of the aerodynamic vehicle are computed based upon the predetermined criteria, such as the relative importance of the respective states of the aerodynamic vehicle and/or the weighting to be given to any outlier measurements. By multiplying the weighted differences by the transpose of the matrix representing changes in the state rates of the aerodynamic vehicle in response to changes in the control effectors, the control method employs a gradient descent technique so as to cause the control effectors that will have the greatest impact upon effecting the desired change to be adjusted more than the control effectors that would have less impact upon effecting the desired change, thereby improving the efficiency of the control scheme by using all available effectors in a coordinated fashion.

The rate of changes $$\dot{\overline{\delta}}$$

of the control effectors required to affect the desired changes in the state rates of the aerodynamic vehicle may also be weighted by a gain matrix as shown by block 17 based upon the relative or perceived importance of the respective control effectors. The gain matrix $K_{ij}$ is a diagonal, positive, semi-definite matrix with one term of the gain matrix associated with the rate of change of each respective control effector. Typically the values of the gain matrix are selected in advance with values larger than one serving to increase the rate of change of the respective control effector and values less than one serving to decrease the rate of change of the respective control effector.

Since control effectors are typically subject to at least some limitations, such as limitations in the predefined range of the control effector and limitations in the permissible rate of change of the control effector, the method and computer program product of one advantageous aspect of the present invention limit the permissible change of each control effector that has these predefined limitations such that the resulting commands issued to the control effectors do not attempt to exceed the limitations of the control effectors. Different limitations may be imposed upon different control effectors. For example, the control signals otherwise provided to the control effectors may be limited, such as by a vector limiter as shown in block 18 of FIG. 1, to prevent the respective control effector from being commanded to change at a rate that exceeds a predefined limit. In this regard, upper and/or lower limits may be predefined such that the permissible rate of change of the respective control effector must remain within the acceptable range bounded by the limit(s). However, in instances in which the aerodynamic vehicle includes a failure detection system, the upper and lower limits may be set to the position of the effector or effectors which are indicated as failed to maintain available performance in this degraded mode of operation.

In order to convert the rates of change $$\dot{\tilde{\delta}}$$

of the control effectors that have been determined to create the desired change in the state rates and, in turn, the state of the aerodynamic vehicle into control effector commands, the rates of change are integrated as represented by block 20 of FIG. 1. In this regard, the rates of change are integrated by employing a local feedback loop in which a time delay 22 and a limiter 24 are located in the feedforward path. The limiter serves to maintain each control effector within a predefined range. For example, the position of a nozzle or control surface may be limited so as to remain within a predefined range of positions, also typically defined by predefined upper and/or lower limits.

Once the desired changes in the control effectors have been appropriately limited so as to prevent any control effector from being commanded to exceed its predefined limitations, the changes in each control effector that have been determined to affect the desired change in the state rates of the aerodynamic vehicle are issued as commands to each of the control effectors and, in the illustrated embodiment, are stored by the zero order hold 26. As such, the desired change in the state rates and, in turn, the desired change in the time rate of change of the system state vector of the aerodynamic vehicle will be affected.

By weighting the differences between the anticipated and desired changes in the state rates of the aerodynamic vehicle, the method of the present invention effectively affects the desired change in the plurality of states of the aerodynamic vehicle in a manner which minimizes the associated costs, as defined by the weighting. In this regard, the cost of the change in the plurality of states of the aerodynamic vehicle is defined as follows:

$$\text{cost}(\bar{\delta}, \bar{w}, \bar{p}) = \left( \sum_{i=1}^{n} w_i \frac{1}{p_i} sgn\left( \left[ \frac{\partial \dot{\tilde{x}}}{\partial \bar{\delta}} \right] \bar{\delta} - \dot{\tilde{x}}_{com} \right) \left\| \left[ \frac{\partial \dot{\tilde{x}}}{\partial \bar{\delta}} \right] \bar{\delta} - \dot{\tilde{x}}_{com} \right\|^{p_i} \right).$$

As described above, this cost is minimized even in instances in which one or more of the control effectors failed or are otherwise defective or frozen in position by design. In this regard, the control method is robust to failures of one or more control effectors since the remaining control effectors are forced or commanded in the direction to bring about the desired change while minimizing the resulting costs. Since the continued use of the failed control effectors will come at a large cost due to the predefined penalty $p_i$ assigned to outliers, the minimization of the cost will cause the other functional control effectors to be recruited and repositioned to affect the desired change.

By minimizing the resulting cost of affecting the desired changes in the state rates of the aerodynamic vehicle, the control method of the present invention affects the desired changes in an efficient manner. See copending U.S. patent application Ser. Nos. 09/967,403 and 09/967,446 for further discussion of the cost function. The entire contents of each of these applications is incorporated herein by reference.

Based upon the cost function, the affect of the predefined penalty $p_i$ that permits greater or lesser emphasis to be placed upon outliers, i.e., large differences between the anticipated and desired changes in the state rates, can be illustrated. In this regard, FIGS. 2 and 3 are two different graphical illustrations of the same curves representing the relationship between the cost and difference v between the anticipated and desired change in a respective state rate of an aerodynamic vehicle. As indicated, larger values of p, i.e., p>2, impose greater penalties upon outliers, thereby increasing the overall cost. Conversely, smaller values of p, i.e., 1<p<2, permit outliers to continue to contribute to the cost, thereby decreasing the cost. Thus, the control of the control effectors may be tailored by a system designer or the like based upon the manner in which outliers which may be representative of an error or failure in the system are to be treated by either being excluded from the control system or by continuing to be included, either completely or in some partial degree. In addition, the control of the control effectors may be further tailored as described above by establishing another weighting w based upon the relative importance of the respective states of the aerodynamic vehicle.

Furthermore, both the continuous and discrete modes of the control method converge. Proof of this convergence is provided by copending U.S. patent application Ser. Nos. 09/967,403 and 09/967,446. Moreover, the control method is capable of quickly determining and then repeatedly redetermining the command to be issued to the control effector so as to insure that vehicle stability is maintained. While the control method was designed to be rapid, embodiments of the control method may utilize single precision floating point numerical representations of the various quantities in order to obtain accurate commands while further increasing the computational throughput.

As indicated above, the method of controlling the plurality of control effectors of an aerodynamic vehicle may be embodied by a computer program product that directs the operation of a flight control computer or the like to issue the commands to the plurality of control effectors in order to affect the desired changes. In this regard, the computer program product includes a computer-readable storage medium, such as the non-volatile storage medium, and computer-readable program code portions, such as a series of computer instructions, embodied in the computer-readable storage medium. Typically, the computer program is stored by a memory device and executed by an associated processing unit, such as the flight control computer or the like.

In this regard, FIG. 1 is a block diagram, flowchart and control flow illustration of methods and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer program product for controlling a plurality of control effectors of an aerodynamic vehicle having a plurality of states, the computer program product comprising a computer-readable storage medium having computer-readable program code embodied in said medium, the computer-readable program code comprising:

a first executable portion for determining a current commanded state of the plurality of control effectors including the current commanded states of nozzle vectoring and at least one aerodynamic surface, wherein the current commanded state of the plurality of control effectors is capable of being different than the current state of the plurality of control effectors;

a second executable portion for determining differences between anticipated changes in the plurality of states of the aerodynamic vehicle based upon the current commanded state of the plurality of control effectors and desired changes in the plurality of states of the aerodynamic vehicle, wherein the second executable portion determines the anticipated changes in the plurality of states based upon the current commanded state of each control effector and current flight conditions; and a third executable portion for controlling the plurality of control effectors at least partially based upon the differences in order to implement at least a portion of the desired changes in the plurality of states of the aerodynamic vehicle.

2. A computer program product according to claim 1 wherein said third executable portion adjusts a control effector that effects a greater portion of the desired change more than a control effector that effects a smaller portion of the desired change.

3. A computer program product according to claim 1 further comprising a fourth executable portion for limiting the permissible change of at least one of the control effectors, wherein said third executable portion controls the plurality of control effectors based upon the weighted differences subject to limitations in the permissible changes of at least one of the control effectors in order to implement at least a portion of the desired change in the plurality of states of the aerodynamic vehicle without exceeding the permissible changes of at least one of the control effectors.

4. A computer program product according to claim 3 wherein said fourth executable portion limits the permissible rate of change of at least one of the control effectors.

5. A computer program product according to claim 3 wherein said fourth executable portion limits at least one of the control effectors to within a predefined range.

6. A computer program product according to claim 1 further comprising a fifth executable portion for weighting the differences between the anticipated and desired changes based upon a predetermined criteria, and wherein said third executable portion controls the plurality of control effectors at least partially based upon the weighted differences.

7. A computer program product according to claim 6 wherein said fifth executable portion weights the differences based upon the relative importance of the respective states of the aerodynamic vehicle.

8. A computer program product according to claim 6 wherein said fifth executable portion weights the differences based upon a predefined penalty having an effect that varies based upon the magnitude of a respective difference.

9. A computer program product according to claim 1 wherein said second executable portion determines a first dot product of a vector representing the current commanded state of each control effectors and a matrix representing changes in the plurality of state rates of the aerodynamic vehicle in response to changes in the plurality of control effector, wherein the matrix is comprised of a plurality of terms, each term representing the anticipated change in a respective state rate of the aerodynamic vehicle in response to the change of a respective control effector, and wherein said second executable portion also obtains a vector difference between the first dot product and a vector representing the desired change in the plurality of states of the aerodynamic vehicle.

10. A computer program product according to claim 9 further comprising a sixth executable portion for constructing the matrix to represent changes in the state rates associated with lift, attitude and a plurality of engine parameters of the aerodynamic vehicle in response to changes in the plurality of control effectors.

11. A computer program product according to claim 9 further comprising a seventh executable portion for determining a second dot product of the weighted vector difference and a transpose of the matrix representing changes in the plurality of state rates of the aerodynamic vehicle in response to changes in the plurality of control effectors, and wherein said third executable portion controls the plurality of control effectors at least partially based upon the second dot product.

12. A computer program product according to claim 11 further comprising an eighth executable portion for weighting the second dot product based upon the relative importance of the respective control effectors such that the plurality of control effectors are controlled based, at least partially, upon the weighted second dot product.

* * * * *